Oct. 19, 1937. W. H. CHURCHILL 2,096,319
SNAP FASTENER MOUNTING BRACKET AND INSTALLATION THEREOF
Filed June 25, 1936
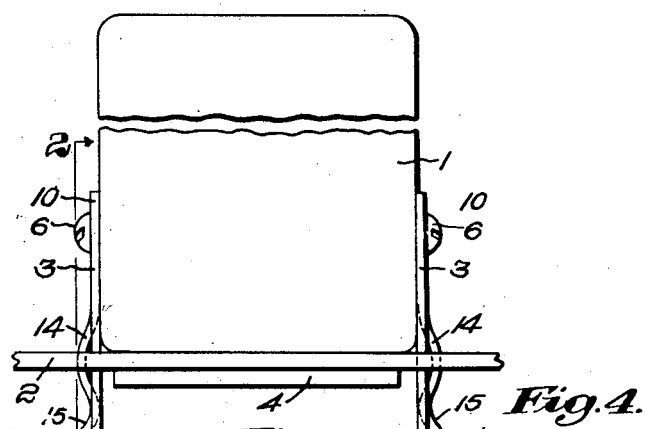
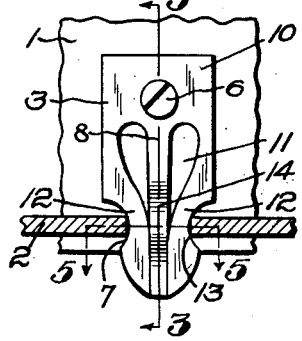
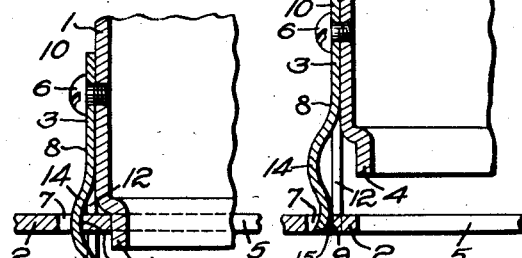
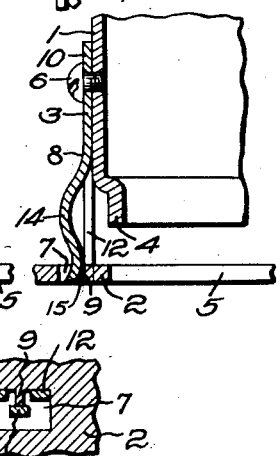
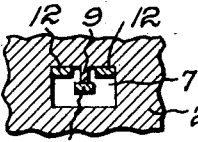
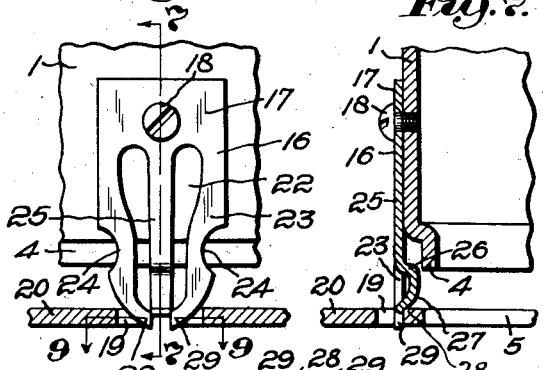
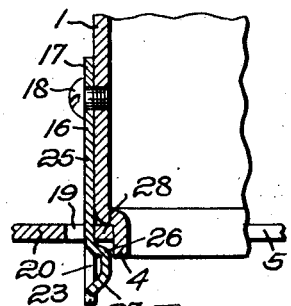
Inventor:
Wilmer H. Churchill
by Walter S. Jones
Atty.

Patented Oct. 19, 1937

2,096,319

UNITED STATES PATENT OFFICE 2,096,319

SNAP FASTENER MOUNTING BRACKET AND INSTALLATION THEREOF

Wilmer H. Churchill, Saugus, Mass., assignor to United-Carr Fastener Corporation, Cambridge, Mass., a corporation of Massachusetts Application June 25, 1936, Serial No. 87,237

9 Claims. (Cl. 248—223)

My invention aims to provide improvements in mounting brackets such as are used for securing electrical units to a support and for installations of the same.

Referring to the drawing, which illustrates preferred embodiments of my invention:—

Figure 1 is a plan view of an electrical installation showing a shield can or a condenser, coil or like, such as used in a radio set, secured to a support by means of my improved mounting brackets;

Fig. 2 is a fragmentary enlarged elevation taken along the line 2—2 of Figure 1;

Fig. 3 is a section taken along the line 3—3 of Fig. 2;

Fig. 4 is a section similar to that of Fig. 3 showing my improved mounting lug in the act of being moved into attaching position;

Fig. 5 is a section taken along the line 5—5 of Fig. 2;

Fig. 6 is a fragmentary view of my modified form of mounting bracket showing the bracket in the act of being moved into attaching position;

Fig. 7 is a section taken along the line 7—7 of Fig. 6;

Fig. 8 is a section similar to that of Fig. 7 showing my mounting bracket in final attachment to a support; and Fig. 9 is a section taken along the line 9—9 of Fig. 6.

Referring to the embodiment of my invention illustrated by Figure 1, I have shown a mounting means for an electrical unit, such as the electrical device 1, which may be a coil, condenser or similar structure. In the illustration my device comprises a container unit 1 detachably secured to a support 2 by means of my improved mounting brackets 3 which are attached to the support 2 by snap fastening means. This particular type of unit 1 has its lower end portion 4 passing through an aperture 5 in the support 2, as illustrated in Figs. 3, 4, 7, and 8. One end of each of my improved mounting lugs 3 is rigidly secured to the unit 1 by an attaching means, such as the nut and screw means 6. The other end of the bracket 3 is shown in snap fastener engagement with the material surrounding an aperture 7 disposed in the support 2. A spring arm portion 8 formed integral with the bracket 3 extends through the aperture 7 and engages the material of the support 2. The arm 8 normally cooperates with the snap fastener means of the bracket to lock the attaching means in fixed engagement with the support, but may be moved when desired so as to permit removal of the attaching means from the support in a manner which will be described. The aperture 7, as most clearly illustrated in Fig. 5, is preferably of a rectangular shape having a projection 9 integral with the material of the support and extending for a predetermined distance into the aperture 7 from a position substantially midway of one of the sides bordering the aperture.

Referring specifically to the form of mounting bracket illustrated in Figs. 2—4, I have provided a one-piece bracket member made from a strip of relatively thin sheet metal. An aperture is provided at one end 10 to receive an attaching member, such as the screw 6, for securing the bracket to the unit with which it is to be assembled. The opposite end of the bracket is divided by a slot 11 providing a pair of yieldable arm portions 12—12. A notch 13 is provided in the outer edge of each of the yieldable arms 12—12 at a predetermined distance from the free end. The outer edge of each arm 12 preferably converges toward the free end from the notch 13 thereby providing a cammed surface to force the arms 12—12 toward each other when they are forced through the aperture 7, as will be hereinafter more fully described.

The spring arm 8 is formed integral with the end 10 and extends downwardly therefrom between the yieldable arms 12—12. The arm 8, as best illustrated in Figs. 3 and 4, has a bowed portion 14 extending laterally out of the plane of the yieldable arms, and the free end of the arm 12 is curved outwardly from a portion of the arm within the plane of the yieldable arms in the same direction as that of the bowed portion 14 in order to provide a cam means 15 for forcing the arm 8 outwardly whereby it may pass through the aperture.

In assembling the parts of the installation together, the end 10 of the bracket is first rigidly secured to the unit 1 by the screw means 6. After the plate is secured to the unit the yieldable arm portions 12—12 are moved into the aperture 7 by a direct axial movement and, as the aperture 7 is made small enough, the ends of the portions 12—12 are cammed toward each other permitting the arms to extend through the aperture until the notches 13—13 engage the material surrounding the aperture in a spring grip, as most clearly shown in Fig. 2. At the time the yieldable arms 12—12 are first inserted into the aperture, the cam portion 15 of the spring arm 8 engages the projection 9 extending into the aperture, as shown in Fig. 4, and as the yieldable arms 12—12 contract during forcing of the same through the aperture, the bowed portion 14 is forced outwardly from between the yieldable arms by reason of the engagement of the cam portion 15 with the projection 9. At the time the notches 13—13 engage the support 2, the cam portion 15 of the arm 8 has passed through the aperture enabling the arm 8 to spring back toward normal position so that a portion of the arm is located within the lateral plane of the yieldable arms 12—12 and in substantially adjacent relation to the inside edges of the arms, as shown in Fig. 3.

When the mounting bracket is in attached position with the arm 8 disposed between the yieldable arms 12—12, it is impossible to contract the arms by direct upward pull upon the bracket so as to enable them to be withdrawn from the aperture. If it is desired to disengage the mounting bracket from the support, force is exerted upon the arm 8 by a suitable tool so as to move the arm from locking position thereby allowing contraction of the yieldable arms 12—12.

Referring now to the modified form of my invention, as shown by Figs. 6—9, I have provided a mounting bracket 16 having an end 17 secured to an electrical unit by a screw means 18 substantially as described in connection with the first form of my invention. The other end of the bracket 16 is provided with yieldable portions adapted to extend through an aperture 19 of a support 20 for snap fastener engagement with the material surrounding the aperture. The aperture 19, as best shown in Fig. 9, preferably has an elongation and an enlargement 21 on one side of the elongation for a purpose which will be hereinafter more fully described. Referring specifically to my modified bracket 16, the opposite end from the end 17 is cut out, as at 22 (Fig. 6), to form the yieldable arm portions 23—23 having notches 24 in their outer edges similar in form to the notches 13 of the first form of my invention. The material of each of the yieldable portions 23—23 between the notch 24 and the free end has a cammed surface for forcing the yieldable arms toward each other during engagement with the material surrounding the aperture 19. The yieldable arm portions 23—23 are similar in form to the arm portions 12—12 of the first form of my invention except for the fact that in my modified form the arms are of thinner construction and provided with converging portions 29 at their free ends. As a result of the thin construction of the yieldable portions 23—23, a relatively wide space between them is provided ending in a space between the free ends 29—29 of the portions 23—23 which is substantially equal to the width of a spring arm 25 normally disposed between the portions 23—23 (Fig. 6).

The spring arm 25 is formed integral with the end 17 of the bracket 16 and has a portion normally in the plane of the yieldable arms 23—23 and a shoulder portion 26 at its lower end extending laterally out of the plane of the yieldable portions 23—23 in the direction of the unit 1, as best illustrated in Figs. 7 and 8. A cammed surface 27 is provided at the lower end of the shoulder 26 for forcing the shoulder portion outwardly to enable the same to be passed through the aperture of the support. The free end of the arm 25 is adjacent to the cammed surface 27 and normally disposed between the converging end portions 29—29 and in the plane of the same, as best shown in Fig. 7.

After the end 17 of the bracket is secured to the mounting unit the yieldable arms 23—23 and the spring arm 25 are moved axially toward the elongation of the aperture 19 of the support. Before the cammed surfaces of the yieldable portions 23—23 engage the material of the support the cammed surface 27 of the arm 25 contacts the material 28 (Figs. 7 and 9) adjacent one side of the aperture 19 thereby forcing the shoulder 26 outwardly in a direction away from the unit 1 so that the free end of the spring arm is moved out from between the converging end portions 29 of the yieldable portions 23—23. As the cammed surface of the yieldable portions 23—23 engage the material surrounding the aperture 19 the converging end portions 29 are forced toward each other enabling the portions 23—23 to pass through the aperture until the notches 24—24 engage the material surrounding the support. The engagement of the cammed surface 27 and the outer surface of the shoulder 26 with the support serves to maintain the free end of the arm 25 out from between the free end portions 29—29 of the yieldable arms while the arms are in contracted relation during insertion of the same through the aperture. As a result of the relatively wide space between the arms 23—23 at points above the converging end portions 29—29, the arm 25 does not interfere with the proper contraction of the arms. At the time the notches 24—24 are engaged with the support, the shoulder 26 has taken a position on the lower side of the support 2 and the free end of the arm 25 has sprung back to normal position between the free end portions 29—29 and in the lateral plane of the same, as most clearly shown in Fig. 8. The enlargement 21 on one side of the aperture 19 is provided purposely to enable the free end of the arm 25 to pass through the support while it is in outward cammed position.

When the notches 24—24 are in engagement with the support the free end of the arm 25 disposed between the free end portions 29—29 prevents contraction of the yieldable arms 23—23 in a manner similar to that of the first form of my invention with the result that they cannot be readily withdrawn from the aperture. It will be noticed that the shoulder 26 is relatively abrupt and spaced slightly from the lower surface of the support so that it is impossible for the free end of the arm 25 to be cammed out from between the free end portions 29—29 by upward axial pull upon the mounting bracket relative to the aperture 19. Disengagement of the bracket from the support may be accomplished through use of a suitable tool to exert pressure upon a portion of the arm 25 so as to move the free end of the arm 25 outwardly in a way to enable the arms 23—23 to contract for detachment of the same from the support.

When my improved mounting brackets are secured to a support, they provide a simple, but highly efficient, steadying means for the unit which they carry as they have firm contacting engagement with the support and, furthermore, unintentional withdrawal of the mounting means from the support is prevented through my improved locking means as described.

Although I have illustrated and described preferred embodiments of my invention, I do not wish to be limited thereby because the scope of my invention is best set forth in the following claims.

I claim:

1. A mounting bracket of the class described having one end constructed for rigid attachment to a member, the other end providing yieldable portions adapted to extend through the aperture of a support and provide means engaging said support, and said bracket having at least one spring arm cooperating with said yieldable portions to lock them against contraction, but being movable to permit contraction when desired.

2. A mounting bracket of the class described having one end constructed for rigid attachment to a member, the other end providing yieldable portions adapted to extend through the aperture of a support and provide means engaging said support, and said bracket having at least one spring arm disposed between said yieldable portions to lock said yieldable portions against contraction, said arm having a cam portion at its free end adapted to engage the material surrounding said aperture for operation of said arm relative to said yieldable portions, at least during the entrance of said yieldable portions into said aperture.

3. A mounting bracket of the class described having one end constructed for rigid attachment to a member, the other end providing yieldable portions adapted to extend through the aperture of a support and provide means engaging said support, and said bracket having at least one spring arm disposed between said yieldable portions to lock said yieldable portions against contraction, said spring arm having a portion disposed laterally relative to the plane of said bracket, a cam portion at the free end of said arm, said cam portion adapted to engage the material surrounding said aperture for operation of said arm relative to said yieldable portions, at least during the entrance of said yieldable portions into said aperture.

4. A mounting bracket of the class described having one end constructed for rigid attachment to a member, the other end providing yieldable portions adapted to extend through the aperture of a support and provide means engaging said support, and said bracket having at least one spring arm disposed between said yieldable portions and adapted to lock said yieldable portions against contraction, said spring arm providing a portion normally in the plane of said yieldable portions, a bowed portion disposed laterally relative to the plane of said bracket and a cam means at the free end of said arm having a portion within the plane of said yieldable portions, said cam means adapted to engage the material surrounding said aperture for moving said arm transversely relative to said yieldable portions during entrance of said yieldable portions into said aperture.

5. A mounting bracket of the class described having one end constructed for rigid attachment to a member, the other end providing yieldable portions adapted to extend through the aperture of a support and provide means engaging said support, and said bracket having at least one spring arm disposed between said yieldable portions to lock said yieldable portions against contraction, said spring arm having a shoulder portion disposed laterally relative to the plane of said bracket, a cam portion at the free end of said arm, said cam portion adapted to engage the material surrounding said aperture for operation of said arm relative to said yieldable portions, at least during entrance of said yieldable portions into said aperture.

6. The combination of parts of electrical apparatus, such as a radio set, comprising an apertured support, a unit of apparatus and at least one snap fastener bracket separately joining said unit to said support, said bracket having one end rigidly secured to said unit, the other end providing yieldable portions extending through the aperture of said support and engaging said support, and said bracket having at least one spring arm cooperating with said yieldable portions and locking them against contraction whereby they cannot be readily detached from said support.

7. The combination of parts of electrical apparatus, such as a radio set, comprising an apertured support, a unit of apparatus and at least one snap fastener bracket separately joining said unit to said support, said bracket having one end rigidly secured to said unit, the other end providing yieldable portions extending through the aperture of said support and having means engaging said support, and said bracket having at least one spring arm extending through said aperture and disposed between said yieldable portions, said spring arm having a portion within the plane of said yieldable portions for preventing contraction of the same when a direct upward pull relative to said aperture is exerted upon said bracket.

8. The combination of parts of electrical apparatus, such as a radio set, comprising a support having an aperture, said support having a projecting portion extending into said aperture, a unit of apparatus and at least one snap fastener bracket separately joining said unit to said support, said bracket having one end rigidly secured to said unit, the other end providing yieldable portions extending through the aperture of said support and having means engaging said support, and said bracket having at least one spring arm providing a cam means whereby said arm is extended through said aperture through engagement of said cam means with said projecting portion and said spring arm having a portion disposed between said yieldable portions on the other side of said support from said first end of said bracket and normally cooperating with said yieldable portions for locking the same against contraction.

9. The combination of parts of electrical apparatus, such as a radio set, comprising an apertured support, a unit of apparatus and at least one snap fastener bracket separately joining said unit to said support, said bracket having one end rigidly secured to said unit, the other end providing yieldable portions extending through the aperture of said support and having means engaging said support, and said bracket having at least one spring arm disposed between said yieldable portions and extending through said aperture, said arm having a shoulder portion extending laterally from the plane of said yieldable portions and a portion disposed within the plane of said yieldable portions on the other side of said support from the first end of said bracket normally preventing contraction of said yieldable portions when upward axial pull force relative to said aperture is exerted upon said bracket.

WILMER H. CHURCHILL.